United States Patent Office 3,493,334
Patented Feb. 3, 1970

3,493,334
PROCESS OF PURIFYING AQUEOUS ZnCl$_2$ SOLUTIONS USED AS SPINNING SOLVENTS
Ross I. Libengood, Williamsburg, Va., assignor to Dow Badische Company, James City County, Va., a corporation of Delaware
No Drawing. Filed May 24, 1968, Ser. No. 731,715
Int. Cl. C01g 9/04; D01f 7/08
U.S. Cl. 23—97          5 Claims

ABSTRACT OF THE DISCLOSURE

A process is presented for removing oxalate impurities from aqueous ZnCl$_2$ solutions used as solvents in the wet spinning of acrylonitrile polymers which involves the adjustment of the pH of the solution and the addition of permanganate to oxidize oxalate ions. This process prevents the formation of insoluble oxalates that tend to clog spinnerette orifices and interrupt the spinning process.

---

This invention relates to a process for improving the wet spinning of acrylonitrile polymers by preventing the formation of insoluble impurities that tend to obstruct spinnerette orifices.

Previously it was known that various metallic impurities produced adverse effects when present in ZnCl$_2$ solutions used as solvents in the spinning of acrylonitrile polymers. Various methods have been presented for removing impurities from these solvents by oxidation to form insoluble oxides, hydroxides, hydroxychlorides, and the like, which form precipitates removable by filtration. Various oxidizing agents have been used for this purpose. Such methods primarily remove interfering inorganic contaminants. Typical agents that have been employed are the various peroxides disclosed in U.S. Patent 2,746,840 and potassium permanganate disclosed in U.S. Patent 3,148,944.

For reasons which have not previously been too clear, it has been found that such use of the permanganates of the prior art for purification of ZnCl$_2$ solvents used in the polymerization and spinning of acrylonitrile polymers has resulted in frequent clogging of the spinnerette orifices, necessitating frequent stoppage and cleaning of the spinnerettes.

In the light of the present invention, it is believed that the use of such oxidizing agents to remove undesirable metallic impurities resulted in reactions with residual monomers and their derivatives which caused the formation of metallic salts of oxalic acid which, in turn, deposited out on the spinnerette head and clogged its orifices.

It is, therefore, an object of this invention to provide a new and useful process for preventing the clogging of spinnerette orifices in the spinning of acrylonitrile polymer solutions.

Another object of this invention is to provide an uncomplicated process for preventing the clogging of spinnerette head orifices.

Additional objects and advantages of the present invention will be apparent by reference to the following detailed description thereof.

In accordance with the present invention, there is provided a new and useful process for preventing the clogging of spinnerette orifices which involves the steps of:

(1) Adjusting the pH of the ZnCl$_2$ solution to be used in the spinning of acrylonitrile polymers to a value between about 1.0 and about 2.0;

(2) Adding sufficient KMnO$_4$ to oxidize oxalate ions present in said solution;

(3) Adjusting the pH of the resulting solution to a value between about 5.0 and about 5.5;

(4) Adding sufficient KMnO$_4$ to oxidize the metallic ions present in said solution; and (5) Filtering the resulting solution to remove insoluble precipitates.

This process is carried out in the following manner: The solution that is to be treated is first stripped of residual monomers. Thereafter, the pH of the resultant solution is lowered by the addition of an acid such as HCl. Sufficient acid is added so that the solution being treated has a pH in the range of about 1.0 to 2.0, and preferably 1.4 to 1.6 when made on a solution made up of one volume of 60% ZnCl$_2$ solution diluted by nine volumes of distilled water or other equivalent dilutions. After the pH adjustment, an aqueous potassium permanganate solution is slowly added to the solution undergoing treatment. This permanganate solution is added until the color of the solution indicates a temporary pink end-point. This pink color slowly fades into a turbid yellow-brown and eventually the solution becomes clear and colorless.

This clear and colorless solution contains manganous ions formed in the oxalate oxidation reaction, i.e., the reaction between the added permanganate and the oxalate. It is usually desirable to remove these ions, and this is accomplished by first adjusting the pH of the acrylonitrile polymer solvent to about 5.0 to 6.0, and preferably 5.0 to 5.5. This pH adjustment is carried out by adding NaOH or ZnO. Other methods of pH adjustment will be obvious to those skilled in the art. Further potassium permanganate solution is then added to the resultant batch until the color of the solution indicates that a characteristic pink end-point has been reached. Normally, this will require about two-thirds of the permanganate used in the oxalate oxidation step. At this point in the procedure, the acrylonitrile polymer solvent is purified of oxalate ions and, as well, the manganous ions occurring as a result of the oxalate oxidation reaction. It is then normal to filter the batch to remove various metallic precipitates.

The solutions that may be treated by the process of this invention are aqueous, saline, acrylonitrile polymer solvents or coagulating solutions which must be treated with an oxidizing agent to remove metallic impurities. The aqueous solution may first be adjusted to a concentration of from 30% to 50% zinc chloride prior to the pH adjustment to a value between about 110 and about 2.0 These solutions contain various concentrations of ZnCl$_2$. By treating such solutions according to the process of this invention, it has been possible to continue spinning for more than four times longer without changing or cleaning the spinnerette than was possible prior to this invention.

Certain precautions are necessary to obtain the best results with the process of this invention. Proper temperature control appears to be important, since high temperatures may encourage other reactions at the expense of the oxalate oxidation reaction. To insure that this does not occur, the temperature of the solution being treated should be maintained within the limits of about 10° C. to 40° C. A temperature of about 23° C. is preferred, since at that temperature the reaction with oxalate predominates. An excess of permanganate should also be avoided in the oxalate oxidation step so that the maximum amount of oxalate is attacked by the permanganate used in this process and to avoid other side reactions. Control of the pH is also important, since there is a definite decrease in oxalate oxidation with a pH slightly above 2.0. For optimum results in the oxalate oxidation step, the pH of the solution should be in the vicinity of 1.5.

The invention may be more fully understood by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the use of the process of this invention for treating aqueous $ZnCl_2$ coagulating solutions.

To 250 ml. (321.2 grams) of aqueous 30% $ZnCl_2$ containing traces of acrylonitrile polymers, monomers, and oxalates, 4.05 ml. of 6.107 N HCl was added to adjust the pH to 1.5. To this 0.96 ml. of 1.99 N $KMnO_4$ was slowly added, dropwise, as the solution was well stirred. An excess of $KMnO_4$ was avoided. The last drop of $KMnO_4$ required 30 seconds for the disappearance of the pink $MnO_4$ color. (The end-point is when the pink color persists for 40 to 50 seconds and the solution turns water-white rather than yellow.) To this clear, water-white solution 24.78 ml. of 0.998 N NaOH was added with stirring to adjust the pH to 5.4. To this 0.64 ml. of 1.99 N $KMnO_4$ was added, dropwise, with stirring. After standing a few minutes to permit coagulation to occur, the mixture was filtered with suction through a 4.25 cm. diameter filter to remove various metallic precipitates. The original sample contained 144 p.p.m. oxalate and 3.3 p.p.m. Mn. The filtrate from the above treatment contained 35 p.p.m. oxalate ion and 17 p.p.m. Mn. Upon correction for dilution, the equivalent concentrations at the initial zinc chloride concentration are 38 p.p.m. oxalate and 19 p.p.m. Mn. All pH measurements were made on 1 volume of 60% $XnCl_2$ diluted with 9 volumes of distilled water or the equivalent dilution of other concentrations. This process was carried out at ambient or room temperature.

EXAMPLE 2

This example illustrates the results obtained by the process of this invention on various spinning solvent batches freed of all but traces of monomers. The tests were conducted on polymerization grade 30% aqueous $ZnCl_2$ which contained traces of acrylonitrile polymers, monomers, and oxalates. The oxalate content of the untreated salt solutions ranged from 300–450 p.p.m. (60% $ZnCl_2$ basis). The oxalate content was reduced by potassium permanganate treatment of this invention as follows:

| Batch No. | P.p.m. oxalate (60% ZnCl₂ basis) | | Percent oxalate removed |
|---|---|---|---|
| | Initial | Final | |
| 1 | 390 | 80 | 79.5 |
| 2 | 373 | 50 | 86.6 |
| 3 | 363 | 90 | 75.4 |
| 4 | 329 | 34 | 89.7 |
| 5 | 300 | 98 | 67.4 |
| 6 | 439 | 0 | 100.0 |
| 7 | 431 | 38 | 91.2 |
| 8 | 450 | 0 | 100.0 |
| 9 | 434 | 0 | 100.0 |
| 10 | 322 | 38 | 79.7 |
| 11 | 439 | 32 | 93.0 |

EXAMPLE 3

This example illustrates the importance of maintaining the proper pH during the oxalate oxidation step.

In this example, the treatment was carried out in a manner similar to that in Example 1. Reagent grade 30% aqueous $ZnCl_2$ solution containing oxalate was used and the pH of the solution was varied. At a pH of 2.14, the oxalate oxidation process was only 58.65% efficient based upon the weight of $KMnO_4$ added to the solution, whereas at a pH of 1.5, the oxidation was close to 100% efficient.

EXAMPLE 4

This example illustrates the suitability of the process for long term use.

Coagulation bath solutions freed of all but traces of monomers were treated in a manner similar to Example 2 over an extended period of time. This treatment was carried out batchwise. The following results were obtained:

| P.p.m. oxalate | |
|---|---|
| Treated | Untreated |
| 44 | 228 |
| 32 | 224 |

After the above solution had been used and reused in a closed polymerization, spinning, and coagulating system, a batchwise treatment was carried out one week later on a 14% sidestream over a period of 5 days. The following analyses were obtained:

| Run | P.p.m. oxalate | |
|---|---|---|
| | Treated | Untreated |
| 1 | 29 | |
| 2 | 40 | |
| 3 | 51 | |
| 4 | 20 | (¹) |
| 5 | 20 | |
| 6 | 28 | |
| 7 | 21 | |
| 8 | 43 | 150 |

¹ Not measured.

Although the invention has been described in considerable detail with reference to certain preferred embodiments, it will be understood that variations and modifications may be made within the spirit and scope of the invention as defined in the appended claims.

What is claimed is:

1. In a wet spinning process for acrylonitrile polymer fibers in which the aqueous $ZnCl_2$ coagulating solution or spinning solvent contains oxalates and is treated with an oxidizing agent to remove metallic impurities, the improvement which comprises the steps of:
    (1) adjusting the pH of said $ZnCl_2$ solution to a value between about 1.0 and about 2.0;
    (2) adding $KMnO_4$ to oxidize oxalate ions present in said solution;
    (3) adjusting the pH of the resulting solution to a value between about 5.0 and about 5.5;
    (4) adding sufficient $KMnO_4$ to oxidize the metallic ions present in said solution; and
    (5) filtering the resulting solution to remove insoluble precipitates.

2. The process of claim 1 in which the amount of $KMnO_4$ added in step (4) to oxidize metallic ions is at least equal to ⅔ of the amount of $KMnO_4$ added in step (2) to oxidize oxalate ions.

3. The process of claim 1 in which the pH is adjusted to a value of about 1.4 to about 1.6 just prior to the oxalate oxidation step.

4. The process of claim 2 in which the aqueous $ZnCl_2$ solution is first adjusted to a concentration of from 30% to 50% zinc chloride prior to the pH adjustment of step (1).

5. The process of claim 4 in which the temperature is maintained between about 10° C. and 40° C.

References Cited

UNITED STATES PATENTS

| 1,706,196 | 3/1929 | Vohl et al. | 23—97 |
| 2,746,840 | 5/1956 | Davis | 23—97 |
| 3,148,944 | 9/1964 | Van Dijk et al. | 23—97 |
| 3,337,296 | 8/1967 | Hill | 23—97 |
| 3,361,521 | 1/1968 | Yoshida et al. | 23—97 |

EDWARD STERN, Primary Examiner

U.S. Cl. X.R.

23—55